(12) United States Patent
Liu

(10) Patent No.: US 11,455,365 B2
(45) Date of Patent: Sep. 27, 2022

(54) DATA PROCESSING METHOD AND APPARATUS

(71) Applicant: Tencent Technology (Shenzhen) Company Limited, Shenzhen (CN)

(72) Inventor: Zhikai Liu, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 374 days.

(21) Appl. No.: 15/218,850

(22) Filed: Jul. 25, 2016

(65) Prior Publication Data

US 2016/0335370 A1 Nov. 17, 2016

Related U.S. Application Data

(63) Continuation of application No. PCT/CN2015/076878, filed on Apr. 17, 2015.

(30) Foreign Application Priority Data

Apr. 18, 2014 (CN) .......................... 201410157995.2

(51) Int. Cl.
   *G06F 16/957* (2019.01)
   *G06F 16/958* (2019.01)
   *G06Q 20/10* (2012.01)

(52) U.S. Cl.
   CPC ........ *G06F 16/9577* (2019.01); *G06F 16/986* (2019.01); *G06Q 20/102* (2013.01)

(58) Field of Classification Search
   CPC ............... G06F 17/9577; G06F 16/986; G06F 17/30905; G06Q 20/102
   See application file for complete search history.

(56) References Cited

U.S. PATENT DOCUMENTS

2007/0299857 A1   12/2007   Gwozdz et al.
2009/0037806 A1*  2/2009    Yang ...................... H04L 67/34
                                                          715/234

(Continued)

FOREIGN PATENT DOCUMENTS

CN   102043832 A     5/2011
CN   102646055 A     8/2012
WO   WO2015/158304 A1  10/2015

OTHER PUBLICATIONS

International Search Report for PCT/CN2015/076878, dated Jul. 15, 2015 (3 pgs).

(Continued)

*Primary Examiner* — Scott T Baderman
*Assistant Examiner* — Steve P Golden
(74) *Attorney, Agent, or Firm* — Morgan, Lewis & Bockius LLP

(57) ABSTRACT

A data processing method includes implementing data transfer between a website having a data processing permission and a website having no data processing permission by using the website having the data processing permission and in a cross-domain manner of a double-layered inline frame when the website having no data processing permission is accessed and data processing is performed in a page of the website; and calling a data processing interface of the website having the data processing permission to perform the data processing.

12 Claims, 13 Drawing Sheets

(56) References Cited

U.S. PATENT DOCUMENTS

| | | | |
|---|---|---|---|
| 2010/0281108 A1* | 11/2010 | Cohen | H04N 21/235 709/203 |
| 2010/0299205 A1 | 11/2010 | Erdmann et al. | |
| 2013/0013499 A1* | 1/2013 | Kalgi | G06Q 20/12 705/41 |
| 2013/0080319 A1* | 3/2013 | Greenstone | G06Q 20/12 705/39 |

OTHER PUBLICATIONS

Office Action dated Apr. 13, 2017 for Chinese Application No. 201410157995.2, 7 pages.
Tencent Technology, Written Opinion, PCT/CN2015/076878, Jul. 15, 2015, 3 pgs.
Tencent Technology, IPRP, PCT/CN2015/076878, Oct. 18, 2016, 4 pgs.

* cited by examiner

DATA PROCESSING METHOD AND APPARATUS

CROSS REFERENCE TO RELATED APPLICATIONS

The present application is a continuation of International Application No. PCT/CN2015/076878, filed on Apr. 17, 2015, which claims priority to Chinese Patent Application No. 201410157995.2, filed on Apr. 18, 2014 with the State Intellectual Property Office of People's Republic of China, both of which are incorporated herein by reference in their entireties.

FIELD OF THE TECHNOLOGY

The present disclosure relates to the field of network technologies, and in particular, to a data processing method and apparatus.

BACKGROUND

With rapid development of mobile intelligent terminals, online payment is more and more frequently completed by means of e-commerce. However, not all websites support an online payment function, and therefore when a user requests to access a page provided by a third-party website B and displayed in a website A having an online payment function, and the page provided by the third-party website B does not have the online payment function, the online payment is implemented by redirecting pages multiple times between the website A and the website B, thereby causing an excessively slow page response speed, which is not beneficial to quick processing of the online payment.

SUMMARY

The a data processing method is disclosed including the following steps:

receiving a page access request sent by a user, a page corresponding to the page access request being a first page having no data processing permission;

generating, according to the page access request, a second page having a first inline frame, and loading the first page in the first inline frame;

receiving a data processing request sent by the user from the first page;

generating a second inline frame on the first page, loading a third page that belongs to a same domain as the second page in the second inline frame, and adding the data processing request to an address of the third page;

transferring the data processing request in the address of the third page to the second page; and calling a data processing interface on the second page and responding to the data processing request.

Further, a data processing apparatus may include:

a receiving module, configured to receive a page access request sent by a user, a page that is corresponding to the page access request being a first page having no data processing permission, and further configured to receive a data processing request sent by the user from the first page;

a first inline frame generating module, configured to generate, responsive to the page access request, a second page having a first inline frame, and to load the first page in the first inline frame;

a second inline frame generating module, configured to generate a second inline frame on the first page, load a third page that belongs to a same domain as the second page in the second inline frame, and add the data processing request to an address of the third page;

an information transfer module, configured to transfer the data processing request in the address of the third page to the second page; and an interface calling module, configured to call a data processing interface on the second page and respond to the data processing request.

DETAILED DESCRIPTION

The following further describes the technical solutions with reference to the accompanying drawings of the specification and specific embodiments. It should be understood that the specific embodiments described herein are only used to explain the present disclosure, but not used to limit the present disclosure.

When a website having no data processing permission is accessed, and data processing is performed in a page of the website, redirection between a website having the data processing permission and the website having no data processing permission does not need to be performed multiple times any more. Instead, data is transferred between the two in a cross-domain manner of a double-layered inline frame, and data processing is performed.

Figure 1:
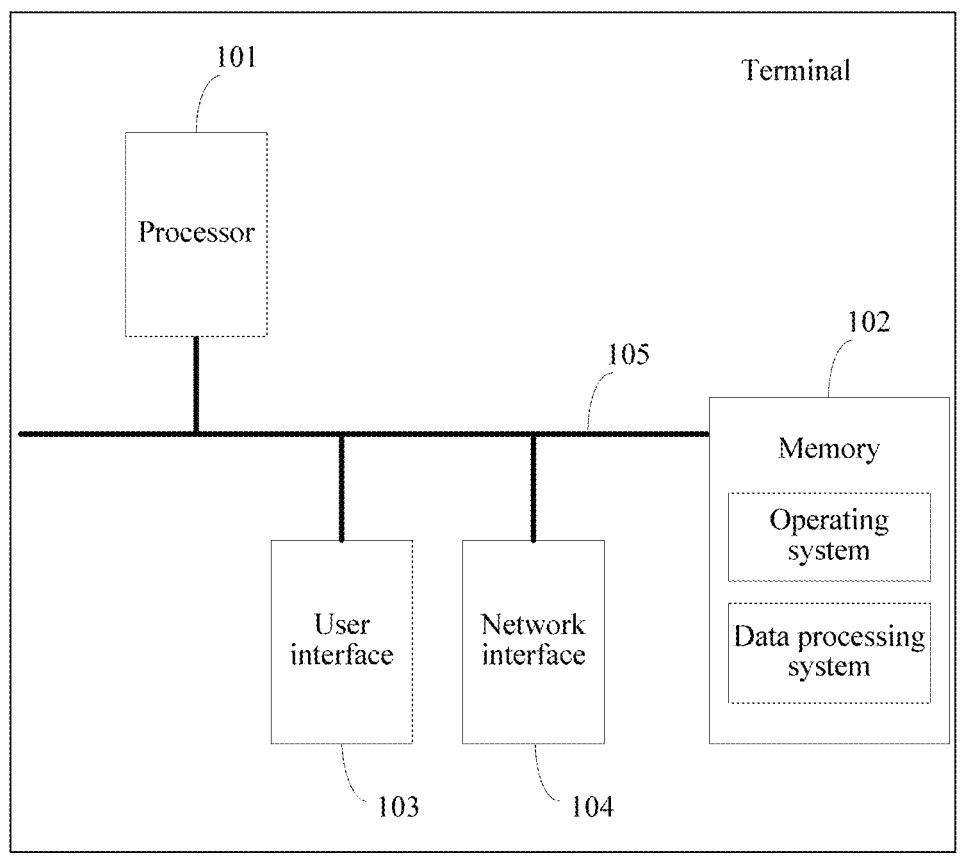
FIG. 1 is a schematic diagram of a hardware architecture of a terminal on which data processing is performed according to the present disclosure.

As shown in FIG. 1, a terminal on which the present disclosure is performed includes a processor 101, a memory 102, a user interface 103, a network interface 104, and a bus 105. The communications bus 105 may be used for communication between components in the terminal; the user interface 103 is configured to receive information input by a user, such as a touch screen, a mouse or a keyboard. The network interface 104 is used for communication between the terminal and the outside environment; the network interface may include a wired interface or a wireless interface, such as an RS 232 module, a radio frequency module, and a WIFI module. The memory 102 may include one or more computer readable storage media, and the memory 102 may include an internal memory, but also includes an external memory either of which may include non-volatile memory as well as volatile memory. The memory stores an operating system, a data processing system, computer programs and the like. The processor 101 is configured to invoke or call at least the data processing system in the memory 102 to implement data transfer between a website having a data processing permission and a website having no data processing permission, so as to perform data processing on a page of the website having no data processing permission.

Figure 2:
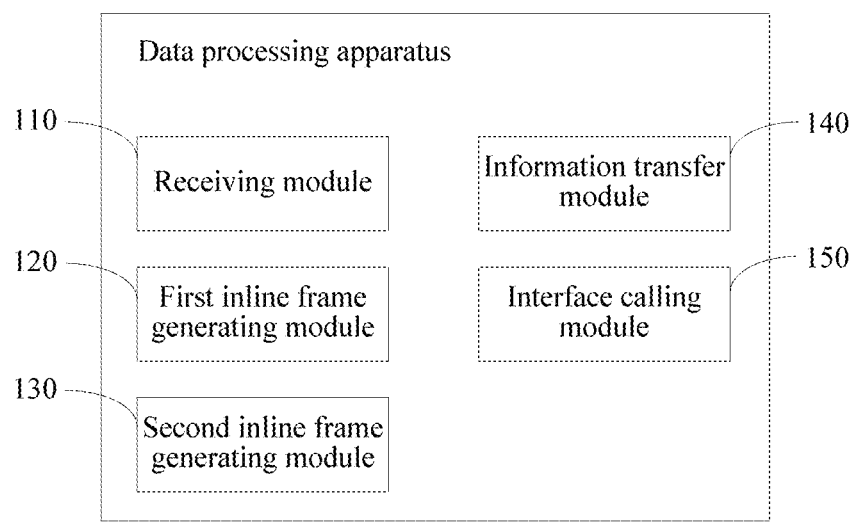
FIG. 2 is an example diagram of functional modules of a first embodiment of a data processing apparatus according to the present disclosure.

The terminal may include a data processing apparatus shown in FIG. 2, where the data processing apparatus includes multiple computer program instruction modules executed by the processor, the multiple instruction modules including:

a receiving module 110, configured to receive a page access request sent by a user, a page corresponding to the page access request being a first page having no data processing permission, and further configured to receive a data processing request sent by the user from the first page;

a first inline frame generating module 120, configured to generate, according to the page access request, a second page having a first inline frame, and load the first page in the first inline frame;

a second inline frame generating module 130, configured to generate a second inline frame on the first page, load a third page that belongs to a same domain as the second page in the second inline frame, and add the data processing request to an address of the third page;

an information transfer module 140, configured to transfer the data processing request in the address of the third page to the second page; and an interface calling module 150, configured to call a data processing interface on the second page and respond to the data processing request.

Figure 3:
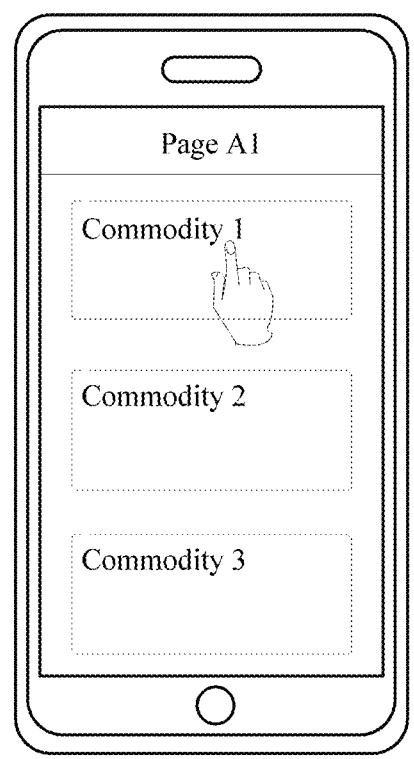
FIG. 3 is an interface example diagram of accessing a page A1 having a data processing permission in a data processing apparatus according to the present disclosure.

User operations on a display interface of the terminal are detected by using the user interface (for example, the touch screen). Data processing on online payment is used as an example. As shown in FIG. 3, when a user accesses a certain website A by means of a browser, redirect to a page A1 of the website A. There is, for example, commodity information of multiple commodities in the page A1, such as a commodity 1, a commodity 2 and a commodity 3. The commodity information may include a picture of a commodity and basic information of a commodity such as a commodity name, a commodity model, or a commodity size. It should be understood that the user can access the website A by means of a browser client of the terminal, and can also access the website A by means of a browser site embedded in another client. When the user needs to purchase the commodity 1, the user can click a display area of the commodity 1 to submit an order. When a touch operation of the user is detected by the touch screen, a page access request is generated to redirect from the page A1 to a page of the commodity 1. The receiving module 110 receives the page access request and sends the page access request to the processor 102, so as to enable the processor 102 to control the terminal to perform page redirection.

Figure 4:
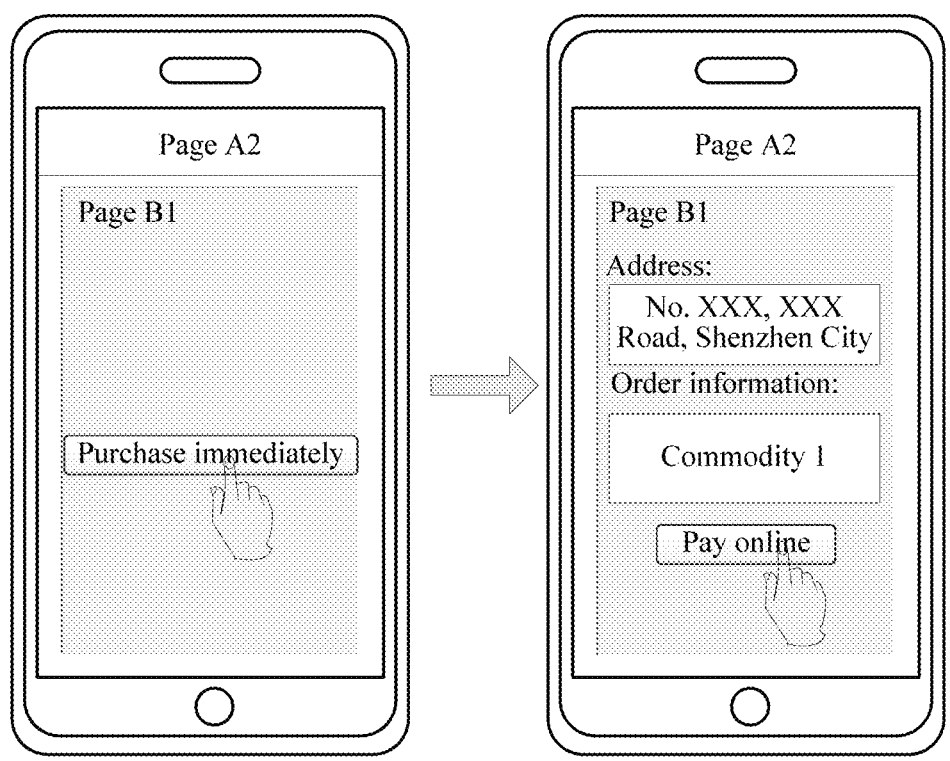
FIG. 4 is an operation example diagram of triggering a data processing request during access to the page A1 in FIG. 3 in a data processing apparatus according to the present disclosure.

The page of the commodity 1 is provided by a website B, the website A supports an online payment function, and the website B does not support the online payment function. Therefore, when the user requests to access a page B1 of the commodity 1, the first inline frame generating module 120 redirects from the page A1 to a page A2 that belongs to a same domain name as the page A1 does, and creates an inline frame such as ifm1 in the page A2. Just as its name implies, the inline frame is a frame embedded in a page, is configured to place any content intended to be placed, which may be a page, and may also be a section of text, an image, or the like. If a page needs to be placed in the inline frame ifm1, an address of the inline frame ifm1 can be assigned a URL address of a page that needs to be placed. Therefore, as long as the URL address of the inline frame ifm1 is assigned an address of the page B1 of the website B, the page B1 of the website B can be loaded in the inline frame ifm1. As shown in FIG. 4, the inline frame ifm1 in the page A2 displays the page of the commodity 1 in the website B. Because the page A2 is still a page belonging to the website A and does not redirect to the website B, and the page A2 displays the page B1 of the commodity 1 in the website B by using the inline frame ifm1, so that the user can submit an order in the page B1 of the inline frame ifm1 in the page A2 without redirecting to the website B to submit the order, which increases the page response speed. In this embodiment, the page A2 merely displays page content of the inline frame ifm1, so that the user can feel that the user still performs operations in the page of the website B. After the user fills out order information and clicks a "pay online" control, and the user operations are detected by the touch screen, operation information is acquired and the data processing request is generated. After receiving the data processing request, the receiving module 110 sends the data processing request to the processor 102, so as to enable the processor 102 to perform the data processing.

Figure 5:
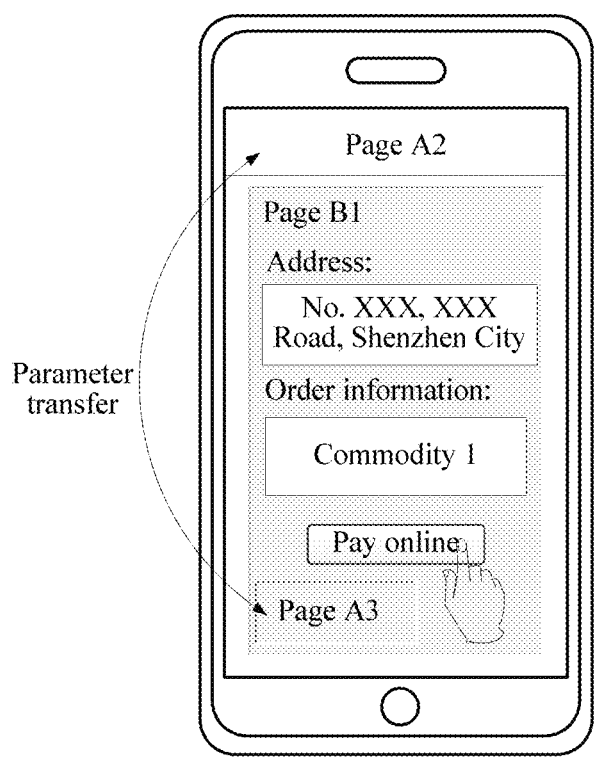
FIG. 5 is an operation example diagram of responding to a data processing request in a data processing apparatus according to the present disclosure.

Because the page B1 and the page A2 are pages belonging to different domain names, the data transfer cannot be directly performed between the page B1 and the page A2. Therefore, in the embodiment of the present invention, a third page A3 established by the second inline frame generating module 130 is used as an information transfer bridge established between the page B1 and the page A2. Specifically, the second inline frame generating module 130 calls a JS interface provided by the website A, and creates an inline frame such as ifm2 in the page B1. Then as long as a URL address of the inline frame ifm2 is assigned an address of the page A3 of the website A, the page A3 of the website A can be loaded in the inline frame ifm2, as shown in FIG. 5. Moreover, the data processing request is added behind the address of the page A3. Because the page A3 and the page A2 are pages belonging to a same domain name, parameters, that is, the preceding order information submitted by the user, of the data processing request in the URL address of the inline frame ifm2 can be acquired. Then the information transfer module 140 transfers the acquired parameters of the data processing request to a processing function in the page A2 by using a parent page transfer method for a parent page. In this embodiment, the page A3 just has JS logic and does not have a page element. Therefore, the second inline frame generating module can further set a display attribute of the page A3 to hidden.

After transferring the acquired parameters in the page A3 to the page A2, the interface calling module 150 calls a payment interface on the page A2 to complete payment of the order. It should be understood that when the page A2 is created, the payment interface needs to be preregistered on the page, so as to be called by the interface calling module 150 to complete the online payment.

A double-layered inline frame may be used, so that when data processing is performed by a website having no processing permission, redirection between a website having the data processing permission and the website having no data processing permission does not need to be performed multiple times, thereby saving page redirection time and increasing the page response speed.

Figure 6:
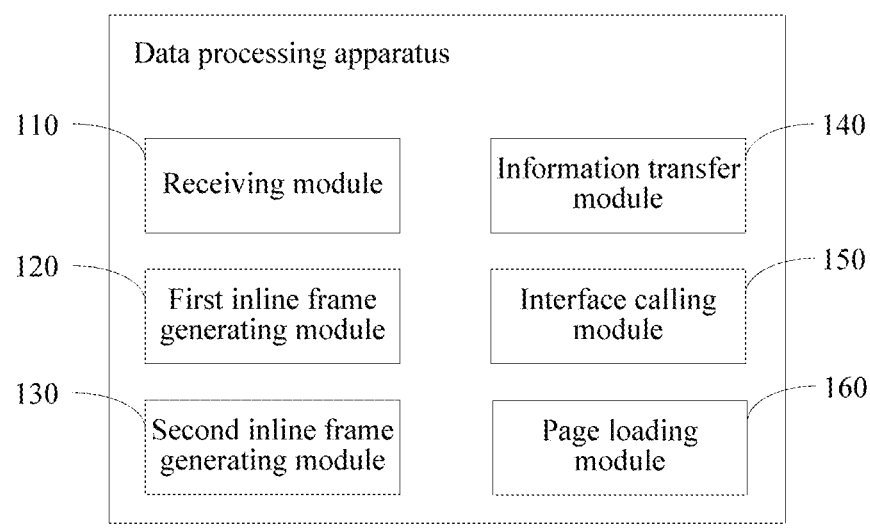
FIG. 6 is an example diagram of functional modules of a second embodiment of a data processing apparatus according to the present disclosure.

Further, as shown in FIG. 6, the data processing apparatus further includes:

a page loading module 160, configured to load a page having the data processing permission, where link information of the first page having no data processing permission is displayed on the page having the data processing permission.

In this embodiment, the page having no data processing permission can be accessed from a page embedded in a client having an online payment function. For example, a certain client has the online payment function, and a permission of the online payment function just aims at a website that is approved by the client. However, a website (for example, an agent) that is not approved by the client cannot use the online payment function. Therefore, a user can access the page having no data processing permission by means of a website embedded in the client. As shown in FIG. 3, the page A1 is a page in the website A that is approved by the client. The page A1 displays link information of a commodity 1, a commodity 2, and a commodity 3, where a page corresponding to the commodity 1 is the page B1 in the website B that is not approved by the client; and pages corresponding to the commodity 2 and the commodity 3 are the pages A2 and A3 in the website A that is approved by the client.

Figure 7:
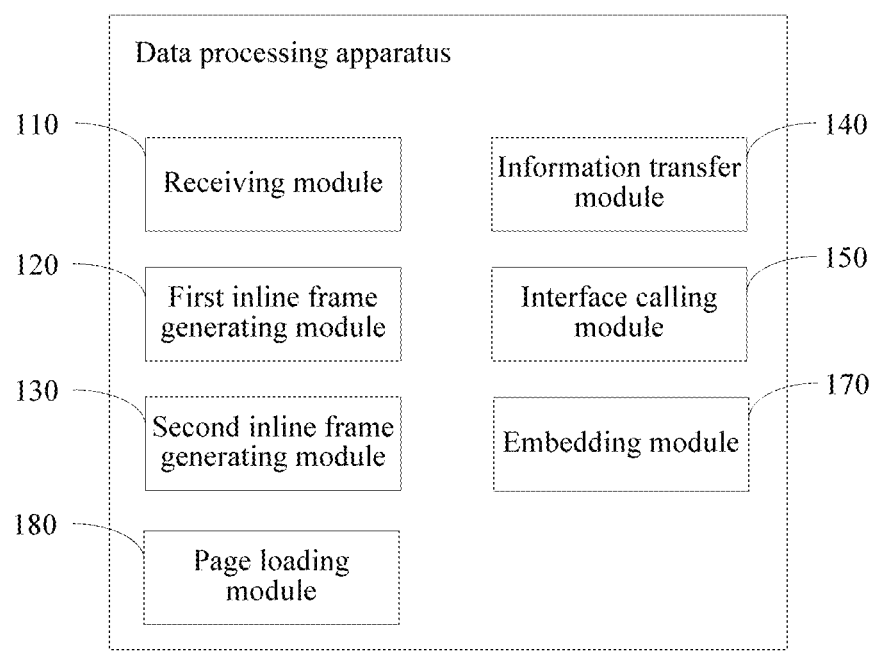
FIG. 7 is an example diagram of functional modules of a third embodiment of a data processing apparatus according to the present disclosure.

Further, as shown in FIG. 7, the data processing apparatus further includes:

an embedding module 170, configured to embed a data processing file provided by the page having the data processing permission into the first page having no data processing permission; and a page loading module 180, configured to load the page having no data processing permission, where link information of the first page having no data processing permission is displayed on the page having no data processing permission.

Figure 8:
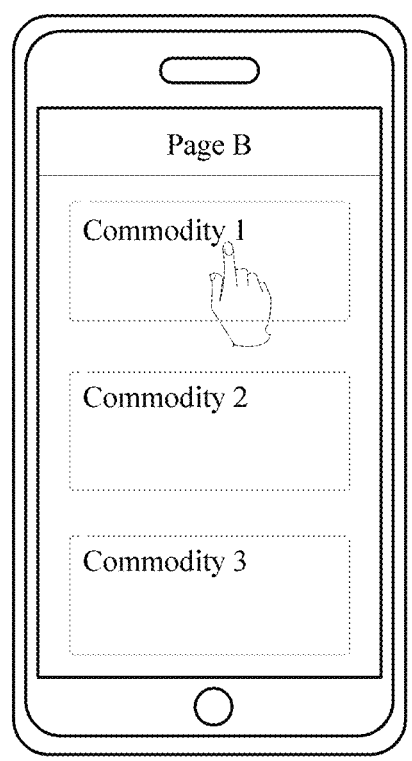
FIG. 8 is an interface example diagram of accessing a page B having no data processing permission in a data processing apparatus according to the present disclosure.

When the website B that does not have the online payment function needed to perform the online payment, the online payment can be implemented as long as a JS file is provided by the website A that has the online payment function is embedded in the page of the website B, thereby enhancing extensibility of the data processing. Therefore, the page having no data processing permission can be accessed by means of a browser client, and the online payment function in the page having no data processing permission can be used. As shown in FIG. 8, the accessed page B of a website having no data processing permission displays link information of a commodity 1, a commodity 2, and a commodity 3. Moreover, none of pages corresponding to the commodity 1, the commodity 2, and the commodity 3 is a page having the data processing permission. The JS file provided by a website having the data processing permission is embedded in the accessed website having no data processing permission. Therefore, when a user clicks a display area of the commodity 1, a page corresponding to the website having the data processing permission is redirected to, for example, the page A2 in FIG. 4, so as to implement the online payment by using the data processing method according to the embodiments.

Further, the first inline frame generating module 120 is further configured to load, after responding to the data processing request is, a data processing result in the first inline frame ifm1. After the data processing is performed by calling the data processing interface, the URL address of the first inline frame ifm1 is assigned a page of the processing result of the page B1, so as to display the data processing result in the first inline frame ifm1, for example, a processing result such as successful payment, failed payment or overtime payment.

Figure 9:
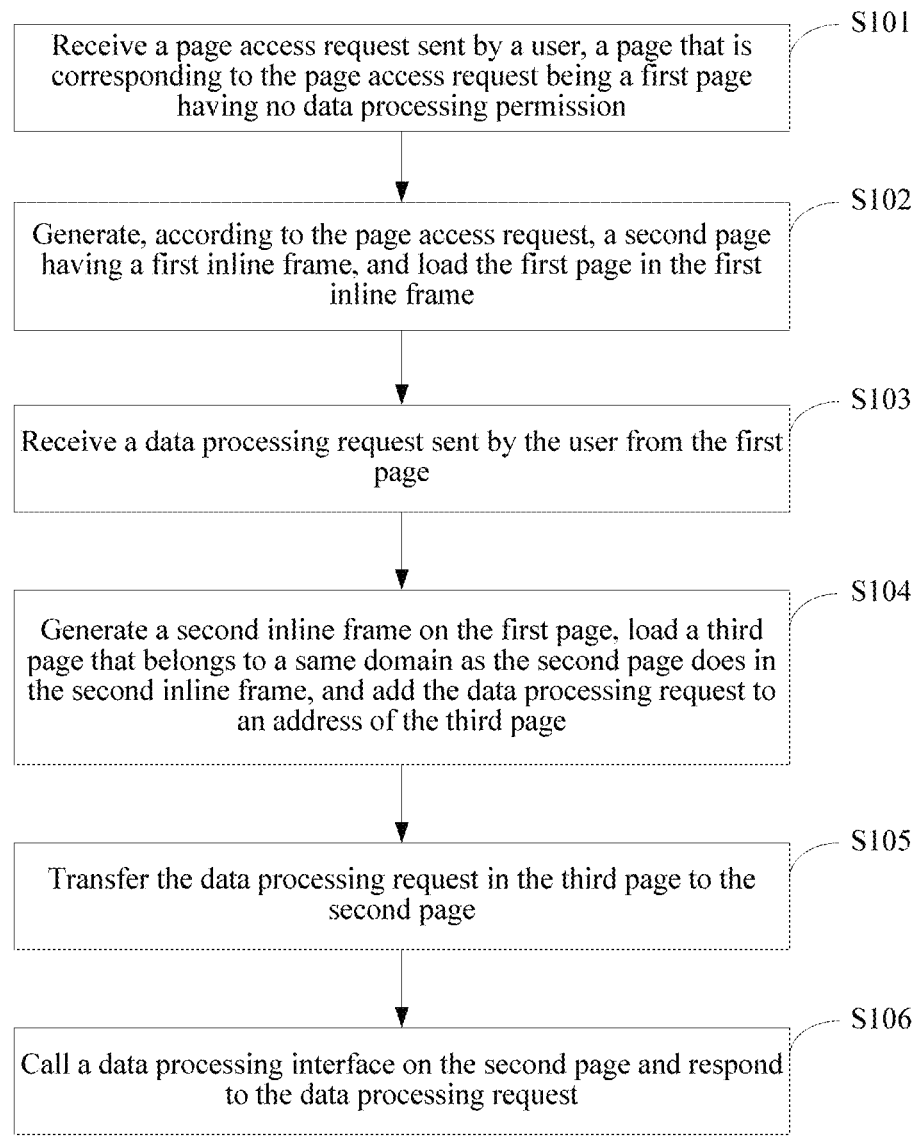
FIG. 9 is a schematic flowchart of a first embodiment of a data processing method according to the present disclosure.

Correspondingly, the present disclosure further provides a data processing method. As shown in FIG. 9, the data processing method according to this embodiment may include the following step:

Step S101: Receive a page access request sent by a user, a page that is corresponding to the page access request being a first page having no data processing permission.

The data processing may include network online data interaction processing based on an Internet platform. However, on the Internet platform, some websites support online data interaction, and some websites do not support the online data interaction. Therefore, when a website in which a page accessed by the user is located supports the online data interaction, the page is a page having the data processing permission; and when a website in which a page accessed by the user is located does not support the online data interaction, the page is a page having no data processing permission.

Step S102: Generate, according to the page access request, a second page having a first inline frame, and load the first page in the first inline frame.

When a website in which a page accessed by the user is located does not support the online data interaction, the second page is first created according to the page access request, and then the first inline frame is created on the second page by using a document.createElement method. Therefore, as long as the URL address of the inline frame ifm1 is assigned an address of the page B1 of the website B, the page B1 of the website B can be loaded in the inline frame ifm1.

Step S103: Receive a data processing request sent by the user from the first page.

The user can perform online data interaction in the first page in the first inline frame to send the data processing request.

Step S104: Generate a second inline frame on the first page, load a third page that belongs to a same domain as the second page does in the second inline frame, and add the data processing request to an address of the third page.

When the data processing request of the user is received, the second inline frame is generated on the first page, and a method for creating the second inline frame is consistent with the method for creating the first inline frame. Then an address of the second inline frame is assigned the address of the third page, thereby loading the third page in the second inline frame. Moreover, the data processing request sent by the user is added behind the address of the second inline frame. The third page and the second page are pages under a same domain name. Furthermore, there is no page element in the third page. Meanwhile, the third page is hidden by setting a css attribute of an inline frame.

Step S105: Transfer the data processing request in the third page to the second page.

The data processing request is extracted from a URL address of the third page; a data processing interface on a parent page of the third page is called; and parameters in the data processing request are transferred to the second page.

Step S106: Call a data processing interface on the second page and respond to the data processing request.

After the parameters in the data processing request are transferred to the second page, the data processing interface on the second page is called to process the data processing request.

A manner of a double-layered inline frame may be used, so that when data processing is performed by a website having no processing permission, redirection between a website having the data processing permission and the website having no data processing permission does not need to be performed multiple times, thereby saving page redirection time and increasing the page response speed.

Figure 10:
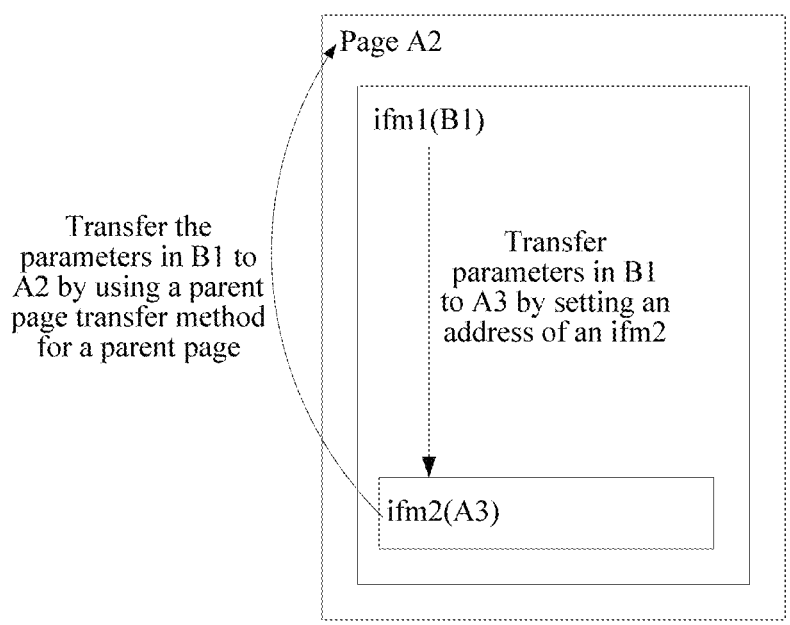
FIG. 10 is an operation example diagram of performing data processing in a page having no data processing permission in a data processing method according to the present disclosure.

The following described the data processing method according in detail by means of data processing of online payment. As shown in FIG. 3, there are multiple pieces of commodity information in the page A1 of the website A, such as a commodity 1, a commodity 2 and a commodity 3. The commodity information may include a picture of a commodity and basic information of a commodity such as a commodity name, a commodity model, or a commodity size. When the user needs to purchase the commodity 1, the user can click a display area of the commodity 1 to submit an order. The page of the commodity 1 is provided by the website B, the website A supports an online payment function, and the website B does not support the online payment function. Therefore, when the user requests to access a page B1 of the commodity 1, a page A2 is created, as shown in FIG. 10. A data processing interface (for example, an online payment interface) is registered in the page A2 at the same time. An inline frame ifm1 is further created in the page A2, so that the page A2 merely displays page content of the inline frame ifm1. Then the URL address of the inline frame ifm1 directs to the page B1 of the website B, thereby enabling the user to submit order information in the page B1 loaded in the inline frame ifm1. Because the page A2 is still a page belonging to the website A and does not redirect to the website B, and the page A2 displays the page B1 of the commodity 1 in the website B by using the inline frame ifm1, so that the user can submit an order in the page B1 of the inline frame ifm1 in the page A2 without redirecting to the website B to submit the order, which increases the page response speed.

Because the page B1 and the page A2 are pages belonging to different domain names, the data transfer cannot be directly performed between the page B1 and the page A2. Therefore, in the embodiment of the present invention, a page A3 that belongs to a same domain name as the page A2 does established in the page B1 is used as an information transfer bridge established between the page B1 and the page A2. Specifically, a JS interface provided by the website A is called, and an inline frame ifm2 is created in the page B1. Then as long as an URL address of the inline frame ifm2 is assigned an address of the page A3 of the website A, the page A3 of the website A can be loaded in the inline frame ifm2. Moreover, the parameters that the user operates on the page B1 can be transferred to the page A3 by setting the URL address of the ifm2; that is, adding the data processing request behind the address of the page A3. Because the page A3 and the page A2 are pages belonging to a same domain name, parameters; that is, the preceding order information submitted by the user, of the data processing request in the URL address of the inline frame ifm2 can be acquired. Then the acquired parameters of the data processing request are transferred to a processing function, that is, the data processing interface, in the page A2 by using a parent page transfer method for a parent page. In this embodiment, the page A3 just has JS logic and does not have a page element. Therefore, a display attribute of the page A3 can further be set to hidden. Finally, the data processing interface registered in the page A2 is called to respond to the data processing.

Figure 11:
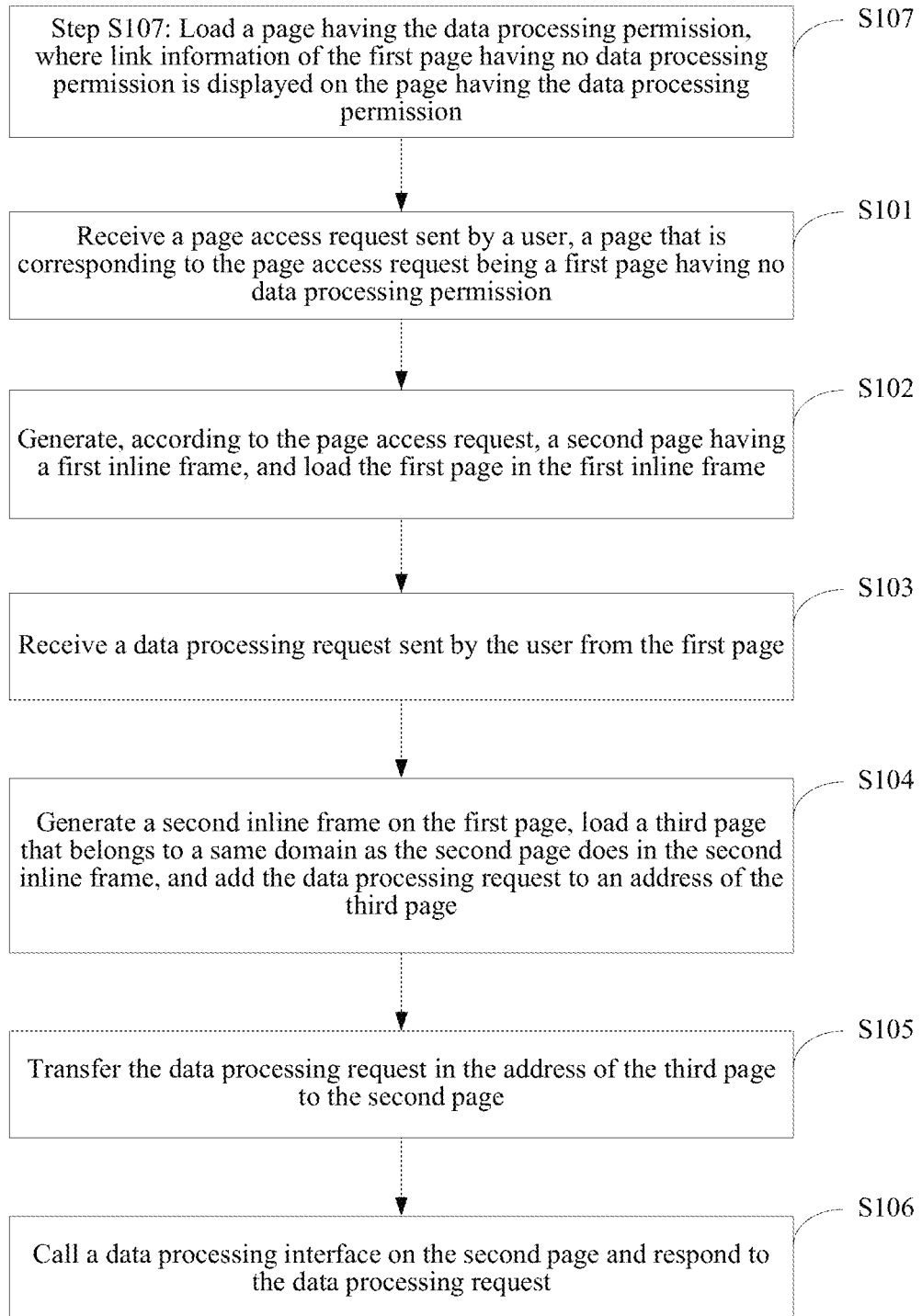
FIG. 11 is a schematic flowchart of a second embodiment of a data processing method according to the present disclosure.

Further, as shown in FIG. 11, before step 5101, the method may further include:

Step S107: Load a page having the data processing permission, where link information of the first page having no data processing permission is displayed on the page having the data processing permission.

The page having no data processing permission can be accessed from a page embedded in a client having an online payment function. For example, a certain client has the online payment function, and a permission of the online payment function aims at a website that is approved by the client. However, a website (for example, an agent) that is not approved by the client cannot use the online payment function. Therefore, a user can access the page having no data processing permission by means of a website embedded in the client. As shown in FIG. 3, the page A1 is a page in the website A that is approved by the client. The page A1 displays link information of a commodity 1, a commodity 2, and a commodity 3, where a page corresponding to the commodity 1 is the page B1 in the website B that is not approved by the client; and pages corresponding to the commodity 2 and the commodity 3 are the pages A2 and A3 in the website A that is approved by the client.

Figure 12:
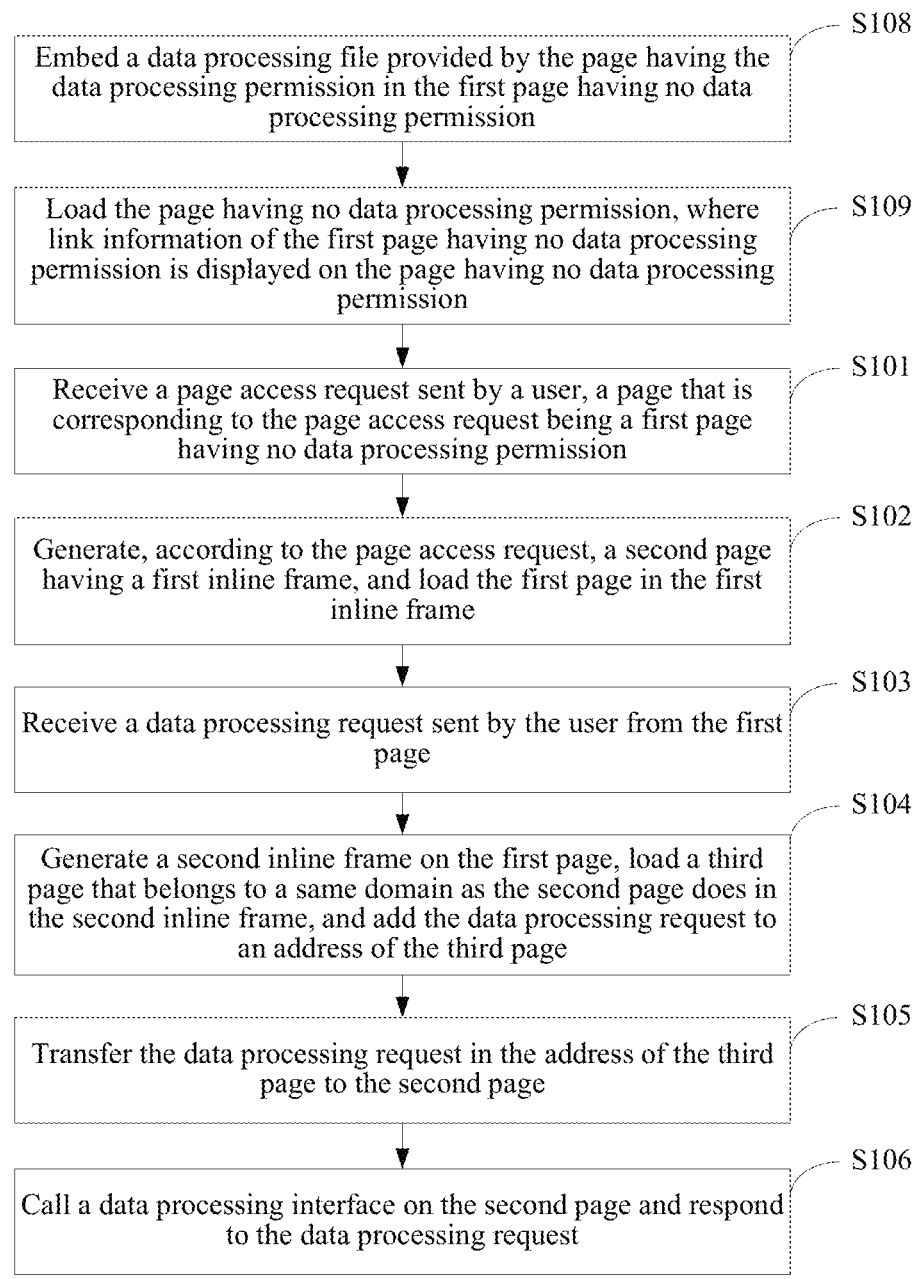
FIG. 12 is a schematic flowchart of a third embodiment of a data processing method according to the present disclosure.

Further, as shown in FIG. 12, before step 5101, the method may further include:

Step S108: Embed a data processing file provided by the page having the data processing permission into the first page having no data processing permission.

When the website B that does not have the online payment function needs to perform the online payment, the online payment can be implemented as long as a JS file is provided by the website A that has the online payment function is embedded in the page of the website B, thereby enhancing extensibility of the data processing. An example of the code of the JS file of a computer program is as follows:

```
xxx.js:
var xxx = (function( ){
    //create an iframe
    var _init = function( ){
        var ifm = document.createElement("iframe");
        ifm.id = "pay_iframe";
        ifm.style.display = "none";
        document.body.appendChild(ifm);
    };
    //perform parameter transfer on the iframe
    var _doPay = function(paystr){
        if(!!paystr){
            var params = [ ];
            params.push("paystr=" +
            encodeURIComponent(paystr));
            var src_str = "www.A./A3.html?" +
            params.join("&"); //splice a parameter that
needs to be transferred behind url
```

-continued

```
            var ifm =
            document.getElementById("pay_iframe");
                if(!!ifm){
                    ifm.src = src_str;
                }
            }else{
                alert("parameter is null, please try again!");
            }
        };
    return {
        init: _init,
        do Pay: _do Pay
        };
    })( );
    xxx.init( );
```

For a page of the website B, as long as reference is made to the JS file and xxx.doPay(paystr) is called, online payment processing can be performed by means of the page A2 of the website A.

Step S109: Load the page having no data processing permission, where link information of the first page having no data processing permission is displayed on the page having no data processing permission.

The page having no data processing permission can be accessed by means of a browser client, and the online payment function in the page having no data processing permission can be used. As shown in FIG. 8, the accessed page B of a website having no data processing permission displays link information of the commodity 1, the commodity 2, and the commodity 3. Moreover, none of pages corresponding to the commodity 1, the commodity 2, and the commodity 3 is a page having the data processing permission. The JS file provided by a website having the data processing permission is embedded in the accessed website having no data processing permission. Therefore, when a user clicks a display area of the commodity 1, a page corresponding to the website having the data processing permission is redirected to, for example, the page A2 in FIG. 4, so as to implement the online payment by using the data processing method according to the embodiments.

Figure 13:
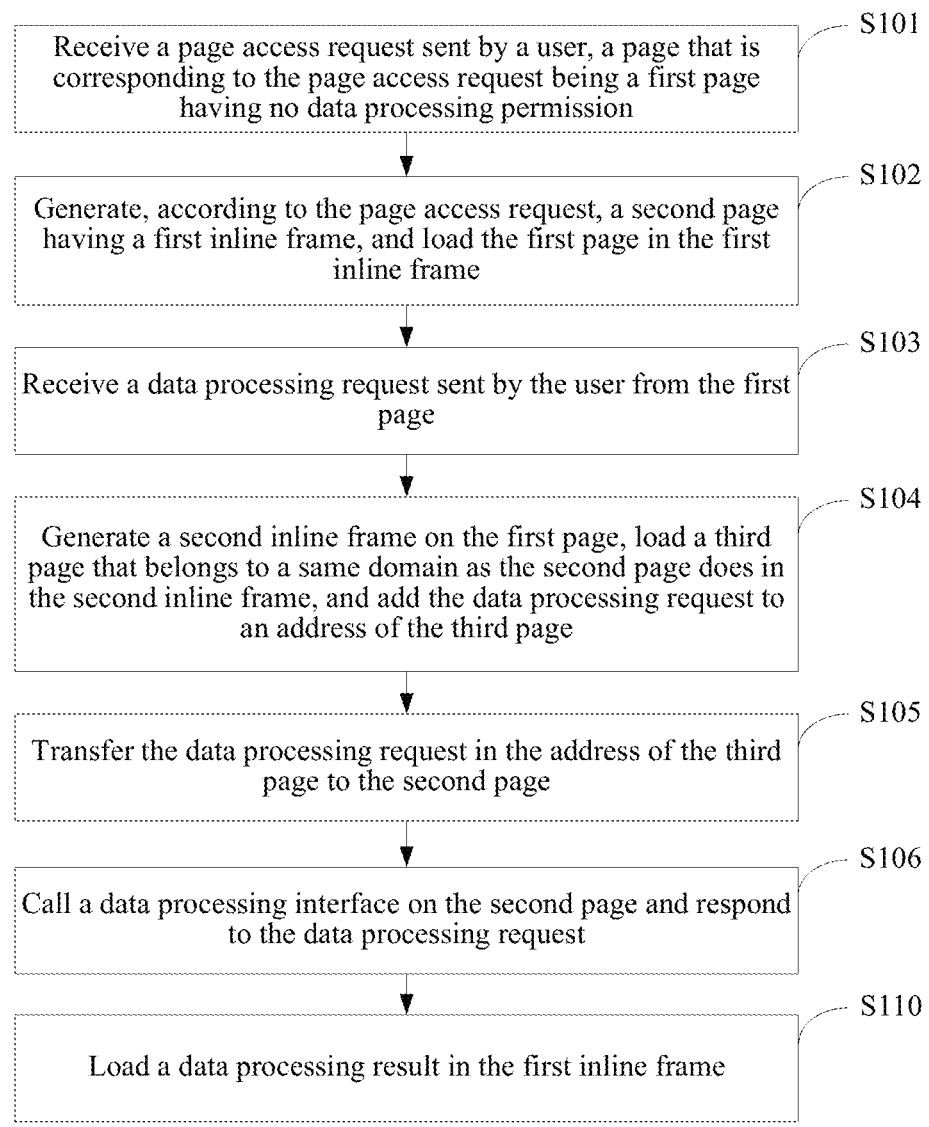
FIG. 13 is a schematic flowchart of a fourth embodiment of a data processing method according to the present disclosure.

Further, as shown in FIG. 13, after step S106, the method further includes:

Step S110: Load a data processing result in the first inline frame. After the data processing is performed by calling the data processing interface, the URL address of the first inline frame ifm1 is assigned a page of the processing result of the page B1, so as to display the data processing result in the first inline frame ifm1, for example, a processing result such as successful payment, failed payment or overtime payment.

The foregoing descriptions are embodiments of the present invention but are not intended to limit the scope of the present disclosure. Any equivalent modifications made to the structures or processes based on the content of the specification and the accompanying drawings of the present disclosure for direct or indirect use in other relevant technical fields shall also be encompassed in the scope of the present claims.

What is claimed is:

1. A data processing method performed at a terminal having one or more processors and memory storing instructions to be executed by the one or more processors, comprising:

receiving, by the one or more processors and via a browser application, a page access request through an initial page of a first website having online payment function, a page corresponding to the page access request being a first page of a second website having no online payment function;

generating, by the one or more processors, according to the page access request, a second page of the first website having a first inline frame, and loading the first page of the second website in the first inline frame within the browser application, wherein link information of the first page of the second website having no online payment function is displayed on the first page of the second website having no online payment function;

embedding, by the one or more processors and via the browser application, a data processing file provided by the first website having online payment function into the first page of the second website having no online payment function;

receiving, by the one or more processors and via the browser application, a data processing request sent by a user of the terminal through the first page of the second website within the first inline frame of the second page of the first website, wherein the data processing request includes a plurality of parameters provided by the user of the terminal through the first page of the second website within the first inline frame of the second page of the first website including commodity information and an address of a payee associated with the second website and the data processing request is stored in the data processing file embedded in the first page of the second website;

generating, by the one or more processors and via the browser application, a second inline frame on the first page of the second website;

determining, by the one or more processors and via the browser application, a URL address of a third page of the first website, wherein the third page of the first website belongs to the same domain as the initial page of the first website and the second page of the first website;

setting, by the one or more processors and via the browser application, a URL address of the second inline frame as the URL address of the third page of the first website concatenated with the data processing request stored in the data processing file embedded in the first page of the second website;

loading, by the one or more processors and via the browser application, the third page of the first website within the second inline frame within the browser application and setting a display attribute of the third page of the first website to be hidden;

transferring, by the one or more processors and via the browser application, the data processing request in the address of the third page of the first website to the second page of the first website by calling a data transfer interface of a parent page of the third page of the first website; and calling, by the one or more processors and via the browser application, a data processing interface on the second page of the first website, and responding to the data processing request to initiate a transaction with the second website having no online payment function according to the commodity information and the address of the payee associated with the second website.

2. The data processing method according to claim 1, before the receiving a page access request sent by a user, further comprising:

loading the initial page of the first website having the online payment function, wherein link information of the first page of the second website having no online payment function is displayed on the initial page of the first website having the online payment function.

3. The data processing method according to claim 1, wherein the second page of the first website displays page content of the first inline frame.

4. The data processing method according to claim 1, after the calling a data processing interface on the second page of the first website, and responding to the data processing request, further comprising:
loading a data processing result of the first website in the first inline frame.

5. A terminal, comprising one or more processors, memory and multiple instruction modules stored in the memory and executed by the one or more processors, the instruction modules comprising instructions for:
receiving, by the one or more processors and via a browser application, a page access request through an initial page of a first website having online payment function, a page corresponding to the page access request being a first page of a second website having no online payment function;
generating, by the one or more processors, according to the page access request, a second page of the first website having a first inline frame, and loading the first page of the second website in the first inline frame within the browser application, wherein link information of the first page of the second website having no online payment function is displayed on the first page of the second website having no online payment function;
embedding, by the one or more processors and via the browser application, a data processing file provided by the first website having online payment function into the first page of the second website having no online payment function;
receiving, by the one or more processors and via the browser application, a data processing request sent by a user of the terminal through the first page of the second website within the first inline frame of the second page of the first website, wherein the data processing request includes a plurality of parameters provided by the user of the terminal through the first page of the second website within the first inline frame of the second page of the first website including commodity information and an address of a payee associated with the second website and the data processing request is stored in the data processing file embedded in the first page of the second website;
generating, by the one or more processors and via the browser application, a second inline frame on the first page of the second website;
determining, by the one or more processors and via the browser application, a URL address of a third page of the first website, wherein the third page of the first website belongs to the same domain as the initial page of the first website and the second page of the first website;
setting, by the one or more processors and via the browser application, a URL address of the second inline frame as the URL address of the third page of the first website concatenated with the data processing request stored in the data processing file embedded in the first page of the second website;

loading, by the one or more processors and via the browser application, the third page of the first website within the second inline frame within the browser application and setting a display attribute of the third page of the first website to be hidden;
transferring, by the one or more processors and via the browser application, the data processing request in the address of the third page of the first website to the second page of the first website by calling a data transfer interface of a parent page of the third page of the first website; and
calling, by the one or more processors and via the browser application, a data processing interface on the second page of the first website, and responding to the data processing request to initiate a transaction with the second website according to the commodity information and the address of the payee associated with the second website.

6. The terminal according to claim 5, the instruction modules comprising instructions for:
loading the initial page of the first website having the online payment function, wherein link information of the first page of the second website having no online payment function is displayed on the initial page of the first website having the online payment function.

7. The terminal according to claim 5, wherein the second page of the first website merely displays page content of the first inline frame.

8. The terminal according to claim 5, wherein the first inline frame generating module is further configured to load, after the data processing request is responded to, a data processing result of the first website in the first inline frame.

9. A non-transitory storage medium storing a computer program, wherein execution of the computer program by one or more processors of a terminal performs the steps of:
receiving, by the one or more processors and via a browser application, a page access request through an initial page of a first website having online payment function, a page corresponding to the page access request being a first page of a second website having no online payment function;
generating, by the one or more processors, according to the page access request, a second page of the first website having a first inline frame, and loading the first page of the second website in the first inline frame within the browser application, wherein link information of the first page of the second website having no online payment function is displayed on the first page of the second website having no online payment function;
embedding, by the one or more processors and via the browser application, a data processing file provided by the first website having online payment function into the first page of the second website having no online payment function;
receiving, by the one or more processors and via the browser application, a data processing request sent by a user of the terminal through the first page of the second website within the first inline frame of the second page of the first website, wherein the data processing request includes a plurality of parameters provided by the user of the terminal through the first page of the second website within the first inline frame of the second page of the first website including commodity information and an address of a payee associated with the second website and the data processing request is stored in the data processing file embedded in the first page of the second website;

generating, by the one or more processors and via the browser application, a second inline frame on the first page of the second website;

determining, by the one or more processors and via the browser application, a URL address of a third page of the first website, wherein the third page of the first website belongs to the same domain as the initial page of the first website and the second page of the first website;

setting, by the one or more processors and via the browser application, a URL address of the second inline frame as the URL address of the third page of the first website concatenated with the data processing request stored in the data processing file embedded in the first page of the second website;

loading, by the one or more processors and via the browser application, the third page of the first website within the second inline frame within the browser application and setting a display attribute of the third page of the first website to be hidden;

transferring, by the one or more processors and via the browser application, the data processing request in the address of the third page of the first website to the second page of the first website by calling a data transfer interface of a parent page of the third page of the first website; and calling, by the one or more processors and via the browser application, a data processing interface on the second page of the first website, and responding to the data processing request to initiate a transaction with the second website according to the commodity information and the address of the payee associated with the second website.

10. The non-transitory storage medium according to claim 9, before the receiving a page access request sent by a user, execution of the computer program is further for:

loading the initial page of the first website having the online payment function, wherein link information of the first page of the second website having no online payment function is displayed on the initial page of the first website having the online payment function.

11. The non-transitory storage medium according to claim 9, wherein the second page of the first website displays page content of the first inline frame.

12. The non-transitory storage medium according to claim 9, after the calling a data processing interface on the second page of the first website, and responding to the data processing request, execution of the computer program is further for:

loading a data processing result of the first website in the first inline frame.

* * * * *